United States Patent [19]
Epple

[11] Patent Number: 5,189,256
[45] Date of Patent: Feb. 23, 1993

[54] APPARATUS FOR COILING AND STORING CONDUCTORS IN A CIRCULAR SHAPE

[75] Inventor: Patrick J. Epple, Bradley Beach, N.J.

[73] Assignee: Keptel, Inc., Tinton Falls, N.J.

[21] Appl. No.: 793,205

[22] Filed: Nov. 18, 1991

[51] Int. Cl.⁵ .................. H02G 3/08; H02G 3/10
[52] U.S. Cl. .................... 174/50; 174/53; 385/134
[58] Field of Search .............. 174/50, 53, 56; 385/134, 135; 439/4, 501

[56] References Cited

U.S. PATENT DOCUMENTS

| | | | |
|---|---|---|---|
| 4,722,585 | 2/1988 | Boyer | 385/135 |
| 4,874,904 | 10/1989 | DeSanti | 174/53 |
| 5,071,211 | 12/1991 | Debortoli et al. | 174/50 |

*Primary Examiner*—Harold Broome
*Attorney, Agent, or Firm*—R. Gale Rhodes, Jr.

[57] ABSTRACT

A frame provided with a plurality of inwardly extending arcuate members for having conductors coiled therearound and for storing the conductors in a generally circular shape. The frame may be mounted intermediate a faceplate and a conductor box, and upon such intermediate mounting the frame may include passageways for receiving screws which mount the faceplate and the frame to the box.

4 Claims, 2 Drawing Sheets

APPARATUS FOR COILING AND STORING CONDUCTORS IN A CIRCULAR SHAPE

BACKGROUND OF THE INVENTION

This invention relates generally to apparatus for coiling and storing electrical distribution and communication conductors, such as copper conductors, optical fibers and cables of each, in a generally circular shape, and more particularly relates to a frame for being mounted intermediate a faceplate and a conductor box and which frame is for coiling and storing such conductors in a generally circular shape to reduce the tendency of such stored conductors to be bent and broken.

Faceplates and conductor boxes are well known to the electrical distribution and communication conductor arts. Typically the faceplate is mounted to the conductor box and the conductor box is typically mounted suitably to a support surface such as a dry wall, and connectors or adapters are typically provided on or mounted to the faceplate for interconnecting incoming conductors to outgoing conductors connected to the connectors or adapters provided on the faceplate. The outgoing conductors typically enter the conductor box through openings provided in the box, typically the box bottom or rear, and excess portions of the outgoing conductors are stored in the conductor box to provide slack and fresh outgoing conductor lengths for reconnection to the connectors or adapters provided in the faceplate. Typically, the excess portions of the outgoing conductors are stored in the conductor box and are typically stuffed, jammed or wadded into the box in a random, haphazard, and most usually non-circular shape. Such non-circular storage as is well known to the art, can result in the stored conductors being bent and broken which interrupts the conductivity of the conductors rendering them useless and necessitating their replacement. Copper electrical distribution and communication conductors can tolerate some non-circular storage and can accept some bending before breaking. However, as is well known, optical fibers can tolerate less bending than copper conductors before breaking or loss of performance occurs.

Accordingly, there exists a need in the art for new and improved apparatus or coiling and storing such conductors in a circular shape or fashion and particularly there exists a need in the art for apparatus which may be mounted intermediate a faceplate and a conductor box and which apparatus coils and stores such conductors in a circular shape.

SUMMARY OF THE INVENTION

The object of this invention is to satisfy the foregoing need in the conductor storage art.

Apparatus satisfying this need and embodying the present invention may include a frame provided with a plurality of inwardly extending arcuate members for having conductors coiled therearound and for storing the conductors in a generally circular shape. The frame may be mounted intermediate a faceplate and a conductor box, and upon such intermediate mounting the frame may include passageways for receiving screws which mount the faceplate and the frame to the box; alternatively the frame may be used without the conductor box and may be mounted, for example, by using dry wall mounts of the type known to the dry wall mounting art.

DETAILED DESCRIPTION OF THE PREFERRED EMBODIMENT

Figure 1:
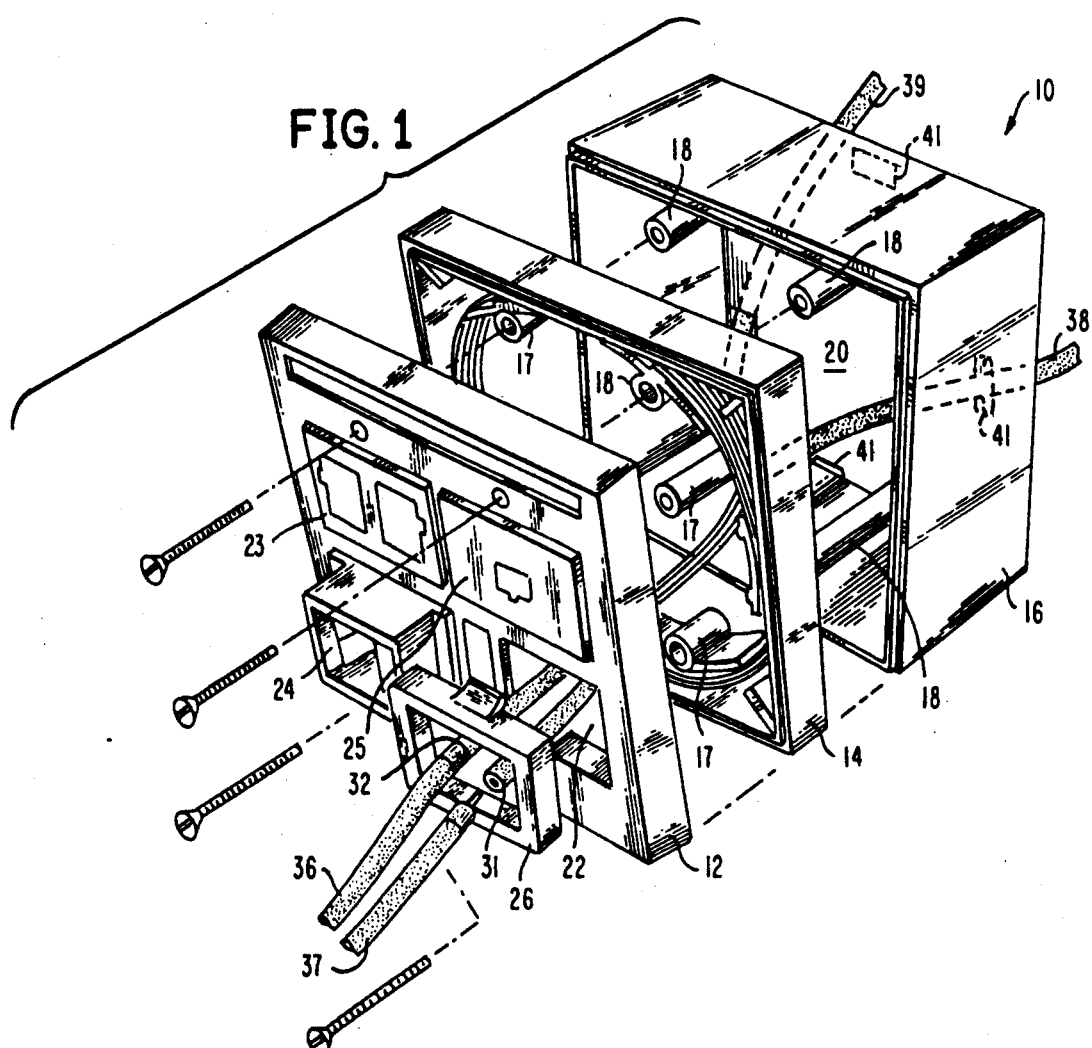
FIG. 1 is an exploded view of apparatus embodying the present invention and illustrates the mounting of a frame embodying the present invention intermediate a faceplate and a conductor box, and which frame is for coiling and storing conductors in a generally circular shape.

Apparatus embodying the present invention is illustrated in FIG. 1 and indicated by general numerical designation 10. Apparatus 10 may include a faceplate 12, a frame 14 and a conductor box 16. As illustrated in FIG. 1, the faceplate 12 and frame 14 may be mounted to the conductor box 16 by a plurality of screws extending through openings formed in the frame and passageways extending through the mounting posts 17 provided on the frame 14 and which screws threadedly engage passageways formed in mounting members 18 provided on the bottom 20 of the box 16. The conductor box may be mounted to a suitable support surface such as a dry wall, for example, by screws (not shown) extending through holes (not shown) formed in the bottom 20 of the box 16.

Referring particularly to the faceplate 12, FIG. 1, the faceplate may be provided with a plurality of openings, e.g. opening 22, into which openings various modules or connectors known to the electrical distribution and communication conductor arts may be snap fitted, such as modules or connectors 23, 24, 25 and, by way of further example optical fiber module or connector 26 which is snap fitted into opening 22. The connector or module 26 is provided with a plurality of optical fiber connectors or adapters 31 and 32 for receiving and interconnecting a pair of optical fibers 36 and 37 with a pair of optical fibers 38 and 39 and which optical fibers 38 and 39 enter the rear of the box 16 through different ones of a plurality of openings 41 provided in the bottom 20 of the box or receptacle 16. It will be understood generally from FIG. 1 that the pair of optical fibers 38 and 39 are coiled around a plurality of arcuate members 42–47 (better seen in FIGS. 2 and 3) and stored in a generally circular shape in the frame 14.

Figure 2:
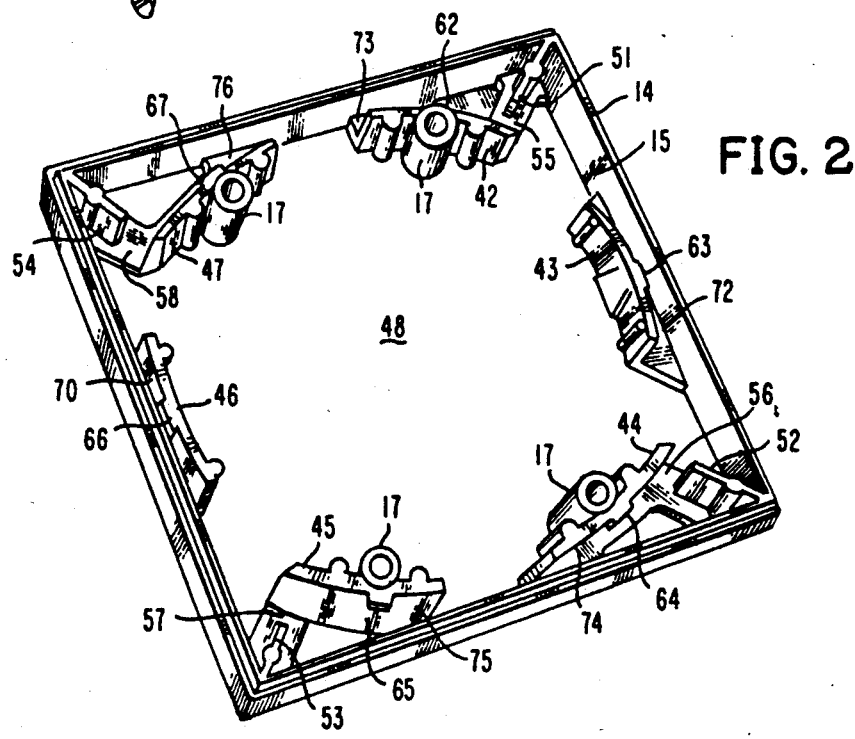
FIG. 2 is a perspective view of the frame of FIG. 1.
Figure 3:
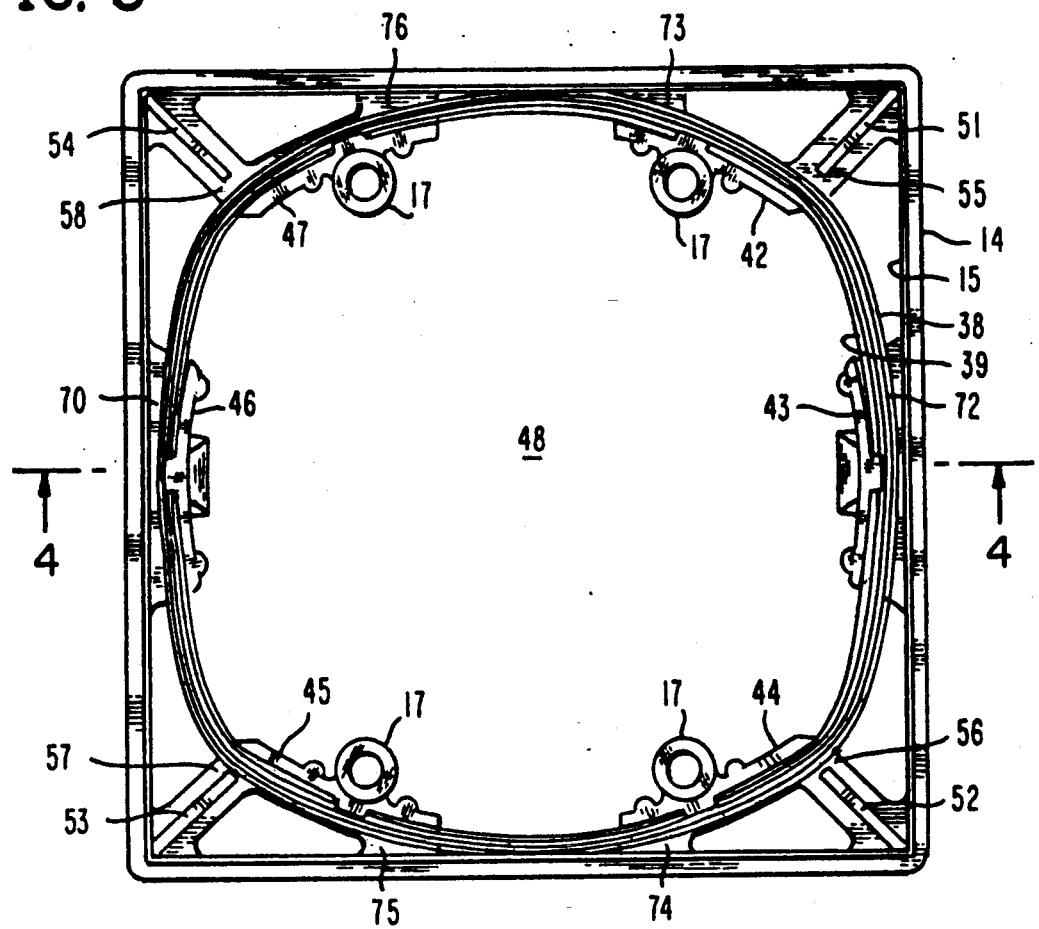
FIG. 3 is an elevational view of the frame shown in FIGS. 1 and 2.
Figure 4:
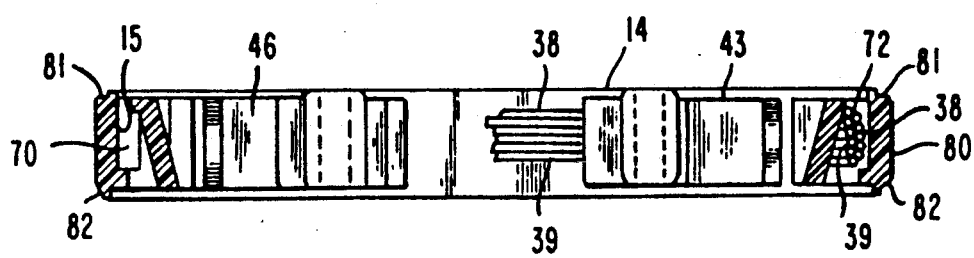
FIG. 4 is a cross-sectional view taken along the line 4—4 in FIG. 3 in the direction of the arrows; in the left-hand portion of FIG. 4 the slot 70 is shown without any conductors residing therein so as to more clearly show the slot.

Referring now particularly to the frame 14 and to FIGS. 2–4, in the embodiment shown, the frame 14 is provided with a generally rectangular shape complementary to the rectangular shape of the faceplate 12 and conductor box shown in FIG. 1, the frame 14 has a generally open interior 48 and includes an inner peripheral portion 15. A plurality of arcuate members 42–47 are provided on the inner peripheral portion 15 of the frame 14 and extend inwardly into the open interior 48 of the frame, and it will be noted particularly from FIG. 3, that the arcuate members 42–47 are spaced apart and aligned generally circularly. The optical fibers 38 and 39 may be coiled around the plurality of arcuate members 42–47 and stored in the frame 14 in a generally circular shape or manner as illustrated in FIG. 3. Such coiling and circular storage greatly reduces bending and breaking of the optical fibers 38 and 39.

As may be best understood from FIGS. 2 and 3, the inner 11 peripheral portion 15 of the frame 14 also may be provided with a plurality of straight members 51–54 extending inwardly toward the frames open interior 48 and it will be noted that the inner end portions of the straight members 51–54 are generally opposite and spaced from opposed end portions of the arcuate members 42, 44, 45 and 47 and such end portions cooperatively form slots 55–58 for assisting in maintaining the optical fibers coiled and stored in a generally circular shape.

Referring further to FIGS. 2 and 3, it will be further understood that the end portions of the arcuate members 42, 44, 45 and 47 opposite the end portions of such arcuate members opposite the end portions of straight members 51–54 are spaced from the inner peripheral portion 15 of the frame 14 and that such end portions of the arcuate members 42, 44, 45 and 47 cooperatively form with the inner peripheral portion 15 of the frame 14 slots 73, 74, 75, 76 for receiving the optical fibers 38 and 39 and for assisting in storing the optical fibers 38 and 39 in a generally circular shape. As may be further understood from FIGS. 2 and 3, particularly FIG. 3, the central portions of the arcuate members 43 and 46 are spaced from the frame inner peripheral portion 15 and that such central portion and inner peripheral portion 15 cooperatively provide slots 70 and 72 (particularly note FIG. 4) for receiving the optical fibers 38 and 39 and for assisting in storing the optical fibers in a generally circular shape.

Further, note FIG. 4 wherein it will be understood that the outer peripheral portion 80 of the frame 14 may be provided with opposed recessed portions 81 and 82 for being received within the faceplate 12 and box or receptacle 16 to facilitate assembly of the frame to the faceplate and box or receptacle.

From FIGS. 2 and 3 it will be further understood that the plurality of arcuate members 42–47 may be provided, respectively, with a plurality of inwardly extending tabs 62–67 for overlying the optical fibers 38 and 39 (FIG. 3) upon the optical fibers being coiled around the arcuate members 42–47; such tabs assist in maintaining the optical fibers coiled and stored in a generally circular shape.

It will be further understood that the frame 14 and faceplate 12 may be mounted to a support surface such as a dry wall other than by the conductor box 16. For example, the faceplate 12 and frame 14 may be mounted to such a support surface by a double-gang recessed box of the type known to the art, or alternatively, they may be mounted directly to such support surface by dry wall mounts of the type known to the art.

Although the present invention has been disclosed with regard to the generally circular coiling and storage of optical fibers, the present invention is equally applicable to the coiling and generally circular storage of other electrical distribution and communication conductors of the types noted above.

It will be understood by those skilled in the art that many variations and modifications may be made in the present invention without departing from the spirit and the scope thereof.

What is claimed is:

1. Apparatus for coiling and storing at least one electrical distribution or communications conductor in a generally circular shape, comprising:

a frame of predetermined shape, said frame having a generally open interior and an inner peripheral portion;

a plurality of generally arcuate members provided on said peripheral portion and extending inwardly into said open interior, said arcuate members spaced apart and aligned generally circularly, said arcuate members spaced apart and aligned generally circularly, said arcuate members for having said conductor coiled therearound to store said conductor in said generally circular shape, and predetermined ones of said arcuate members including first end portions; and a plurality of generally straight members provided on said peripheral portion and extending inwardly towards said open interior, said straight members including end portions generally opposite to and spaced from said first end portions of said predetermined ones of said arcuate members, said end portions of said straight members and said first end portions of said predetermined ones of said members cooperatively providing slots for receiving said conductor and for assisting in maintaining said conductor in said circular shape upon being coiled around said arcuate members.

2. The apparatus according to claim 1 wherein said predetermined ones of said arcuate members include second end portions spaced from said inner peripheral portion of said frame and wherein said second end portions and said inner peripheral portion of said frame cooperatively provide slots for receiving said conductor and for assisting in maintaining said conductor in said circular shape upon being coiled around said arcuate members, and wherein predetermined other ones of said arcuate members include generally central portions spaced from said inner peripheral portion of said frame and wherein said central portions and said inner peripheral portion of said frame cooperatively provide slots for receiving said conductor and for assisting in maintaining said conductor in said circular shape upon being coiled around said arcuate members.

3. The apparatus according to claim 1 wherein each of said arcuate members is provided with at least one tab extending inwardly towards said frame and for overlying said conductor upon said conductor being coiled around said arcuate members said tab for assisting in maintaining said conductor coiled around said arcuate members and stored in said circular shape.

4. The apparatus according to claim 1 wherein said apparatus further comprises a faceplate and a conductor box, wherein said frame provided with said plurality of arcuate members is for being mounted intermediate said faceplate and box and wherein said frame is provided with mounting means for mounting said frame intermediate said faceplate and said box.

* * * * *

UNITED STATES PATENT AND TRADEMARK OFFICE
CERTIFICATE OF CORRECTION

PATENT NO. : 5,189,256
DATED : February 23, 1993
INVENTOR(S) : Christopher D. Clark et al It is certified that error appears in the above-indentified patent and that said Letters Patent is hereby corrected as shown below:

On the title page: Item [75]

The inventors are Christopher D. Clark, Brick, New Jersey; George R. Steenton, Howell, New Jersey; Patrick J. Epple, Bradley Beach, New Jersey.

Column 3, line 4, after "inner" delete "11".

Column 4, Claim 1, lines 14-15, delete "spaced apart and aligned generally circularly, said arcuate members".

Signed and Sealed this

Twenty-eighth Day of December, 1993

Attest:

BRUCE LEHMAN

*Attesting Officer*  *Commissioner of Patents and Trademarks*